United States Patent
Konishi

(10) Patent No.: US 10,208,877 B2
(45) Date of Patent: Feb. 19, 2019

(54) RAPID-CONNECT COUPLER WITH VENT STOP

(71) Applicant: Engineered Controls International, LLC, Elon, NC (US)

(72) Inventor: Howard M. Konishi, Redmond, WA (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 15/932,266

(22) Filed: Feb. 16, 2018

(65) Prior Publication Data

US 2018/0187812 A1 Jul. 5, 2018

Related U.S. Application Data

(63) Continuation of application No. 15/140,011, filed on Apr. 27, 2016, now Pat. No. 9,897,239.

(60) Provisional application No. 62/153,399, filed on Apr. 27, 2015.

(51) Int. Cl.
*F16L 37/18* (2006.01)
*F16L 37/12* (2006.01)
(Continued)

(52) U.S. Cl.
CPC .............. *F16L 37/18* (2013.01); *F16L 37/12* (2013.01); *F16L 37/36* (2013.01); *F16L 55/07* (2013.01); *F16L 2201/40* (2013.01)

(58) Field of Classification Search
CPC . F16L 37/18; F16L 37/12; F16L 27/36; F16L 55/07; F16L 2201/40
See application file for complete search history.

(56) References Cited

U.S. PATENT DOCUMENTS

| 430,721 A | 6/1890 | Winkler |
| 2,070,013 A | 2/1937 | Krannak |
(Continued)

FOREIGN PATENT DOCUMENTS

| CA | 2166844 | 7/1996 |
| CN | 1135588 | 11/1996 |
(Continued)

OTHER PUBLICATIONS

International Search Report and Written Opinion for PCT/US2016/029583 dated Jul. 5, 2016 (11 pp.).

*Primary Examiner* — Kevin Lee
(74) *Attorney, Agent, or Firm* — Neal, Gerber & Eisenberg LLP

(57) ABSTRACT

A rapid connect coupler can include a housing, a probe configured to translate within the housing, a handle assembly configured to cause the probe to translate within the housing body, a stop assembly configured to selectively arrest the translation of the probe. The stop assembly can include: a pawl configured to occupy both an active position and an inactive position, wherein the inactive position arrests the translation of the probe; a catch fixed to the housing and configured to hold the probe in the inactive position; a lever configured to engage the pawl; a spring fixed to both the housing and the lever and configured to bias the pawl to the inactive position via the lever; and a cam configured to disengage the pawl from the catch and cause the pawl to occupy the active position.

20 Claims, 9 Drawing Sheets

(51) Int. Cl.
*F16L 55/07* (2006.01)
*F16L 37/36* (2006.01)

(56) References Cited

U.S. PATENT DOCUMENTS

| | | | |
|---|---|---|---|
| 2,259,137 A | 10/1941 | Iftiger, Sr. |
| 2,323,099 A | 6/1943 | Patten |
| 2,327,714 A | 8/1943 | Iftiger, Sr. |
| 2,388,179 A | 10/1945 | Prowd |
| 2,434,167 A | 1/1948 | Knobblauch |
| 2,512,320 A | 6/1950 | Fischer |
| 2,552,543 A | 5/1951 | Earle et al. |
| 2,675,829 A | 4/1954 | Livers |
| 2,797,110 A | 6/1957 | Covington |
| 2,904,351 A | 9/1959 | Gellett et al. |
| 3,069,127 A | 12/1962 | Perry et al. |
| 3,474,827 A | 10/1969 | Rosell |
| 3,583,667 A | 6/1971 | Amneus, Jr. |
| 3,589,673 A | 6/1971 | Cruse |
| 3,674,051 A | 7/1972 | Stratman |
| 3,680,591 A | 8/1972 | Vik |
| 3,710,823 A | 1/1973 | Vik |
| 3,757,836 A | 9/1973 | Masuda |
| 3,809,122 A | 5/1974 | Berg |
| 3,897,091 A | 7/1975 | McMath et al. |
| 3,913,844 A | 10/1975 | Petrovic |
| 3,924,654 A | 12/1975 | Buller et al. |
| 4,124,228 A | 11/1978 | Morrison |
| 4,181,150 A | 1/1980 | Maldavs |
| 4,234,161 A | 11/1980 | Wilder et al. |
| 4,303,098 A | 12/1981 | Shindelar |
| 4,347,870 A | 9/1982 | Maldavs |
| 4,366,945 A | 1/1983 | Blauenstein |
| 4,398,561 A | 8/1983 | Maldavs |
| 4,437,647 A | 3/1984 | Cruse |
| 4,541,457 A | 9/1985 | Blenkush |
| 4,543,995 A | 10/1985 | Weh et al. |
| 4,552,333 A | 11/1985 | Niemi |
| 4,676,269 A | 6/1987 | Sarson |
| 4,716,938 A | 1/1988 | Weh et al. |
| 4,726,390 A | 2/1988 | Franklin |
| 4,799,512 A | 1/1989 | Sarson |
| 4,881,573 A | 11/1989 | Durant et al. |
| 4,884,830 A | 12/1989 | Meisinger |
| 4,921,282 A | 5/1990 | Meisinger |
| 5,002,254 A | 3/1991 | Belisaire et al. |
| 5,046,523 A | 9/1991 | Horhota |
| 5,074,332 A | 12/1991 | Jones |
| 5,080,132 A | 1/1992 | Manz et al. |
| 5,092,364 A | 3/1992 | Mullins |
| 5,127,428 A | 7/1992 | Fahl |
| 5,129,621 A | 7/1992 | Maiville et al. |
| 5,139,049 A | 8/1992 | Jensen et al. |
| 5,161,568 A | 11/1992 | Turvey |
| 5,205,317 A | 4/1993 | Neuerberg et al. |
| 5,211,197 A | 5/1993 | Marrison et al. |
| 5,255,714 A | 10/1993 | Mullins |
| 5,265,844 A | 11/1993 | Westfall |
| 5,289,850 A | 3/1994 | Sarson et al. |
| 5,290,009 A | 3/1994 | Heilmann |
| 5,293,902 A | 3/1994 | Lapierie |
| 5,301,723 A | 4/1994 | Goode |
| 5,339,862 A | 8/1994 | Haunhorst |
| 5,363,879 A | 11/1994 | Rhoades |
| 5,413,309 A | 5/1995 | Giesler |
| 5,429,155 A | 7/1995 | Brzyski et al. |
| 5,439,258 A | 8/1995 | Yates |
| 5,445,358 A | 8/1995 | Anderson |
| 5,507,530 A | 4/1996 | Mahaney |
| 5,535,985 A | 7/1996 | Larbuisson |
| 5,547,166 A | 8/1996 | Engdahl |
| 5,564,471 A | 10/1996 | Wilder et al. |
| 5,575,510 A | 11/1996 | Weh et al. |
| 5,577,706 A | 11/1996 | King |
| 5,580,099 A | 12/1996 | Eaton |
| 5,603,353 A | 2/1997 | Clark et al. |
| 5,630,570 A | 5/1997 | Lacroix et al. |
| 5,649,723 A | 7/1997 | Larsson |
| 5,671,777 A | 9/1997 | Allen et al. |
| 5,706,967 A | 1/1998 | Weh et al. |
| 5,709,243 A | 1/1998 | Wells et al. |
| 5,788,443 A | 8/1998 | Cabahug |
| 5,806,832 A | 9/1998 | Larbuisson |
| 5,884,648 A | 3/1999 | Savage |
| 5,896,889 A | 4/1999 | Menard |
| 5,927,683 A | 7/1999 | Weh et al. |
| 5,937,885 A | 8/1999 | Sampson |
| 5,950,679 A | 9/1999 | Danielson et al. |
| 5,967,491 A | 10/1999 | Magnuson et al. |
| 5,984,265 A | 11/1999 | Engdahl |
| 5,988,697 A | 11/1999 | Arosio |
| 6,035,894 A | 3/2000 | Weh et al. |
| 6,039,303 A | 3/2000 | Danielson et al. |
| 6,056,010 A | 5/2000 | Wells |
| 6,073,971 A | 6/2000 | Weh et al. |
| 6,073,974 A | 6/2000 | Meisinger et al. |
| 6,082,399 A | 7/2000 | Nyberg |
| 6,152,496 A | 11/2000 | Kouda |
| 6,155,294 A | 12/2000 | Comford et al. |
| 6,161,578 A | 12/2000 | Braun et al. |
| 6,202,692 B1 | 3/2001 | Schumacher |
| 6,257,278 B1 | 7/2001 | Danielson et al. |
| 6,279,874 B1 | 8/2001 | Nyberg |
| 6,343,630 B1 | 2/2002 | Dubinsky |
| 6,375,152 B1 | 4/2002 | Weh et al. |
| 6,382,251 B1 | 5/2002 | Hopson |
| 6,398,268 B1 | 6/2002 | Takahashi et al. |
| 6,408,880 B1 | 6/2002 | Kaul |
| 6,412,828 B1 | 7/2002 | Lacroix et al. |
| 6,499,719 B1 | 12/2002 | Clancy et al. |
| 6,511,100 B1 | 1/2003 | Le Clinche |
| 6,637,460 B2 | 10/2003 | Haunhorst |
| 6,705,550 B2 | 3/2004 | Bell |
| 6,776,187 B1 | 8/2004 | Marquis et al. |
| 6,830,070 B2 | 12/2004 | Mikiya et al. |
| 6,840,276 B2 | 1/2005 | Zeiber et al. |
| 6,840,548 B2 | 1/2005 | Lacroix |
| 6,945,477 B2 | 9/2005 | Lambert et al. |
| 7,040,358 B2 | 5/2006 | Lacroix et al. |
| 7,073,773 B2 | 7/2006 | Nuttall et al. |
| 7,469,718 B2 | 12/2008 | Lambert et al. |
| 7,497,231 B2 | 3/2009 | Sasa |
| 7,568,737 B2 | 8/2009 | Wells et al. |
| 7,753,415 B2 | 7/2010 | Tiberghien et al. |
| 7,841,580 B2 | 11/2010 | Konishi et al. |
| 8,056,581 B2 | 11/2011 | Danielson et al. |
| 9,115,838 B2 | 8/2015 | Konishi |
| 9,732,893 B2 | 8/2017 | Konishi |
| 9,897,239 B2 * | 2/2018 | Konishi ............. F16L 37/18 |
| 2003/0085574 A1 | 5/2003 | Froment et al. |
| 2004/0094956 A1 | 5/2004 | Lacroix et al. |
| 2007/0001143 A1 | 1/2007 | Konishi et al. |
| 2007/0235092 A1 | 10/2007 | Danielson et al. |
| 2008/0011369 A1 | 1/2008 | Matsumoto |
| 2008/0128034 A1 | 6/2008 | Fahl |
| 2008/0185837 A1 | 8/2008 | Danielson |
| 2008/0265574 A1 | 10/2008 | Tiberghien et al. |
| 2009/0140519 A1 | 6/2009 | Pavnaskar et al. |
| 2009/0165870 A1 | 7/2009 | Konishi |
| 2009/0205722 A1 | 8/2009 | Sledz |
| 2010/0127198 A1 | 5/2010 | Cozza |
| 2010/0148499 A1 | 6/2010 | Le Quere |
| 2011/0005639 A1 | 1/2011 | Weh et al. |
| 2011/0186176 A1 | 8/2011 | Aehle et al. |
| 2012/0280493 A1 | 11/2012 | Konishi |
| 2014/0261741 A1 | 9/2014 | Konishi |

FOREIGN PATENT DOCUMENTS

| | | |
|---|---|---|
| CN | 2293698 | 10/1998 |
| CN | 1502839 | 6/2004 |
| CN | 1608910 | 4/2005 |
| CN | 101946113 | 1/2011 |
| CN | 103547848 | 1/2014 |

(56) References Cited

FOREIGN PATENT DOCUMENTS

| | | |
|---|---|---|
| DE | 19882564 | 8/2000 |
| EP | 0039977 | 11/1981 |
| EP | 2689177 | 1/2014 |
| WO | WO1980001711 | 8/1980 |
| WO | WO1993025838 | 12/1993 |
| WO | WO2003095883 | 11/2003 |
| WO | WO2012129340 | 9/2012 |
| WO | WO2013059748 | 4/2013 |

\* cited by examiner

RAPID-CONNECT COUPLER WITH VENT STOP

CROSS-REFERENCE

This patent application is a continuation of U.S. patent application Ser. No. 15/140,011, filed on Apr. 27, 2016, now U.S. Pat. No. 9,897,239, which claims priority to U.S. Provisional App. No. 62/153,399, filed on Apr. 27, 2015. The contents of these prior applications are hereby incorporated by reference in their entirety.

TECHNICAL FIELD

This disclosure generally relates to a rapid-connect coupler configured to deliver cold fluid to a receptacle (e.g., a fuel tank).

BACKGROUND

Cold fluids at cryogenic temperatures (e.g., less than −150° C.) pose special handling problems, principally because the temperature of such fluids may quickly cool any valve or coupler through which they flow. When such a coupler is used to transfer a cryogenic fluid, freeze-up problems may occur if the transfer takes place in a moist or high-humidity environment. Water within or immediately outside of the coupler may freeze, thereby impeding subsequent movement of mechanical parts within the coupler. Successive transfers from a single coupler to multiple receptacles may compound the problem.

Additionally, when de-coupling a coupler and receptacle, some amount of fluid venting to ambient is necessary. If the vented fluid is at high pressure, the venting may cause the coupler to forcefully eject from the receptacle.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

An embodiment of the present disclosure provides a rapid-connect coupler including a vent stop assembly that includes a release lever, release spring, latch pawl, latch spring, catch, and reset cam. The latch pawl may be configured to engage with a probe flange of a probe to implement a hard stop of the probe translating within the rapid-connect coupler. The catch may be configured to hold the latch pawl in an "up" position.

According to some embodiments, a rapid-connect coupler including a housing body, a probe, a handle assembly, and a stop vent assembly is disclosed. The probe may be configured to translate within the housing body. The handle assembly may be coupled to the housing body and the probe, and the handle assembly may be configured to cause the probe to translate within the housing body. The stop vent assembly may be configured to enable the rapid-connect coupler to transition from a decoupled configuration to a coupled configuration without a hard stop, and configured to enable the rapid-connect coupler to transition to a venting configuration between transitioning from the decoupled configuration to the coupled configuration.

The rapid-connect coupler may further include a vent stop apparatus configured to allow a coupling head of the rapid-connect coupler to transition from a decoupled configuration to a coupled configuration without obstruction. The vent stop apparatus may further be configured to provide a hard-stop at a venting position as the coupling head transitions from the coupled configuration to the decoupled configuration.

According to some embodiments, a rapid connect coupler consistent with the present disclosure may include a housing, a probe configured to translate within the housing, retaining objects, a slideable sleeve configured to cause radial translation of the retaining objects, a poppet and a valve seat located inside of the probe, the poppet configured to translate with respect to the probe, a handle assembly configured to cause the probe to translate within the housing body, a stop assembly configured to selectively arrest the translation of the probe. The stop assembly can include: a pawl configured to occupy both an active position and an inactive position, wherein the inactive position arrests the translation of the probe; a catch fixed to the housing and configured to hold the probe in the inactive position; a lever configured to engage the pawl; a spring fixed to both the housing and the lever and configured to bias the pawl to the inactive position via the lever; and a cam configured to disengage the pawl from the catch and cause the pawl to occupy the active position.

According to some embodiments, a rapid connect coupler consistent with the present disclosure includes a housing; a probe configured to translate in a longitudinal direction within the housing; a handle assembly configured to cause the probe to translate within the housing, wherein the handle assembly is movable between a first position corresponding to a decoupled position where the fluid holding tank is disconnected from the receptacle and a second position corresponding to a coupled position where the fluid holding tank is connected to the receptacle and a third position corresponding to a venting position where the fluid holding tank is connected to the receptacle and venting of fluid is enabled; and a stop assembly configured to selectively arrest the translation of the probe in a first translation direction when the handle assembly is moved from the second position to the third position.

According to additional embodiments, a rapid connect coupler consistent with the present disclosure includes a housing body; a probe configured to translate within the housing body; a plurality of retaining objects; a slidable sleeve configured to cause radial translation of the plurality of retaining objects with respect to the housing body; a poppet and a valve seat located inside of the probe, the poppet configured to translate with respect to the probe; a handle assembly configured to cause the probe to translate within the housing body; and a stop assembly configured to selectively arrest the translation of the probe, the stop assembly including: a pawl configured to occupy both an active position and an inactive position, wherein the inactive position arrests the translation of the probe; a catch fixed to the housing body and configured to hold the probe in the inactive position; a lever configured to engage the pawl; a spring fixed to both the housing body and the lever and configured to bias the pawl to the inactive position via the lever; and a cam configured to disengage the pawl from the catch and cause the pawl to occupy the active position.

For a better understanding of the disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified. It should be understood that for clarity in certain cross-sectional views, certain elements are not shown in cross-section, as doing so would not assist in the understanding of the invention.

BRIEF DESCRIPTION

DETAILED DESCRIPTION

Figure 1:
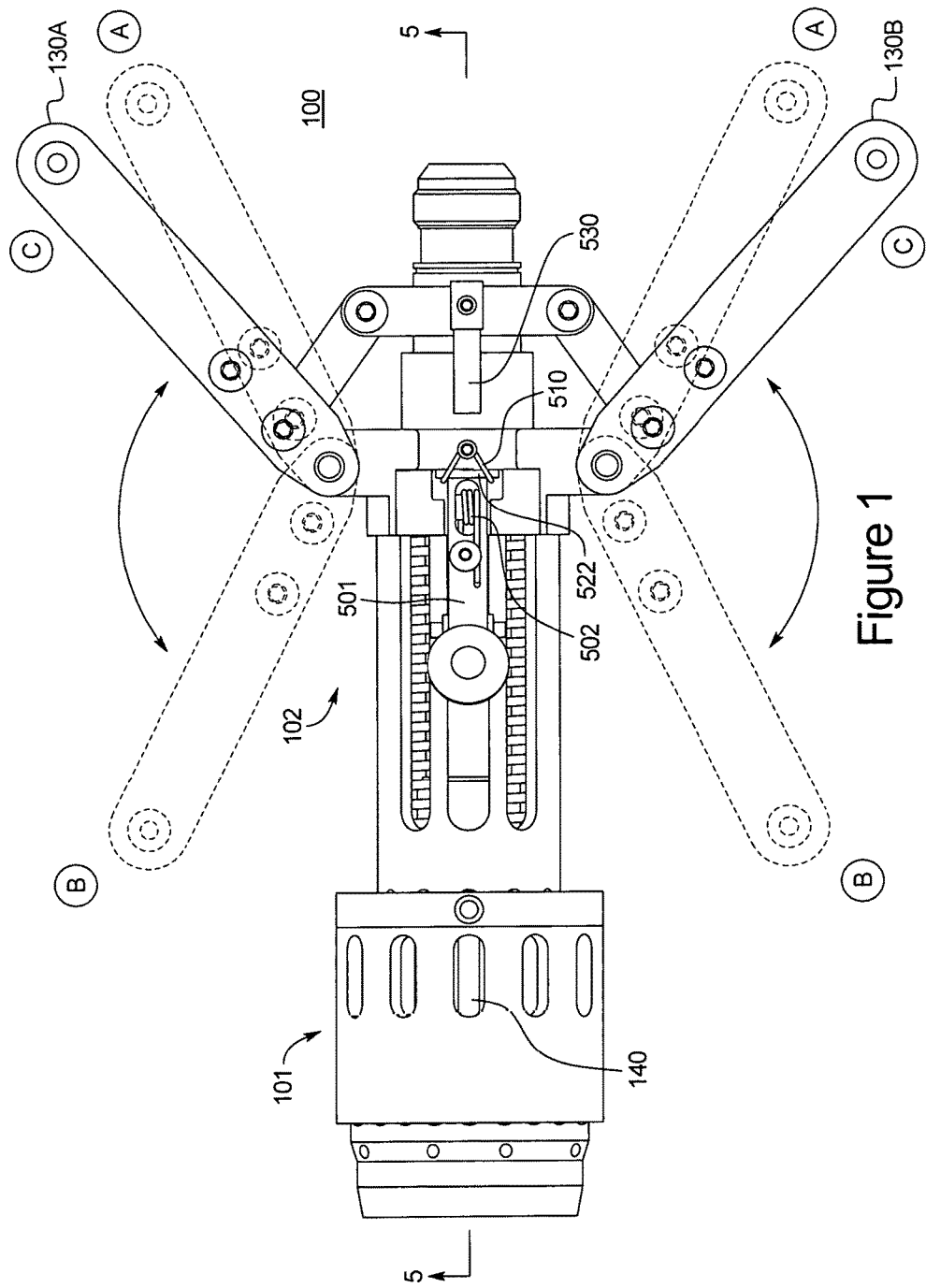
FIG. 1 is a top view of a rapid-connect coupler, depicting three handle positions.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. As stated above, it should be understood that for clarity in certain cross-sectional views, certain elements are not shown in cross-section, as doing so would not assist in the understanding of the invention.

Figure 2:
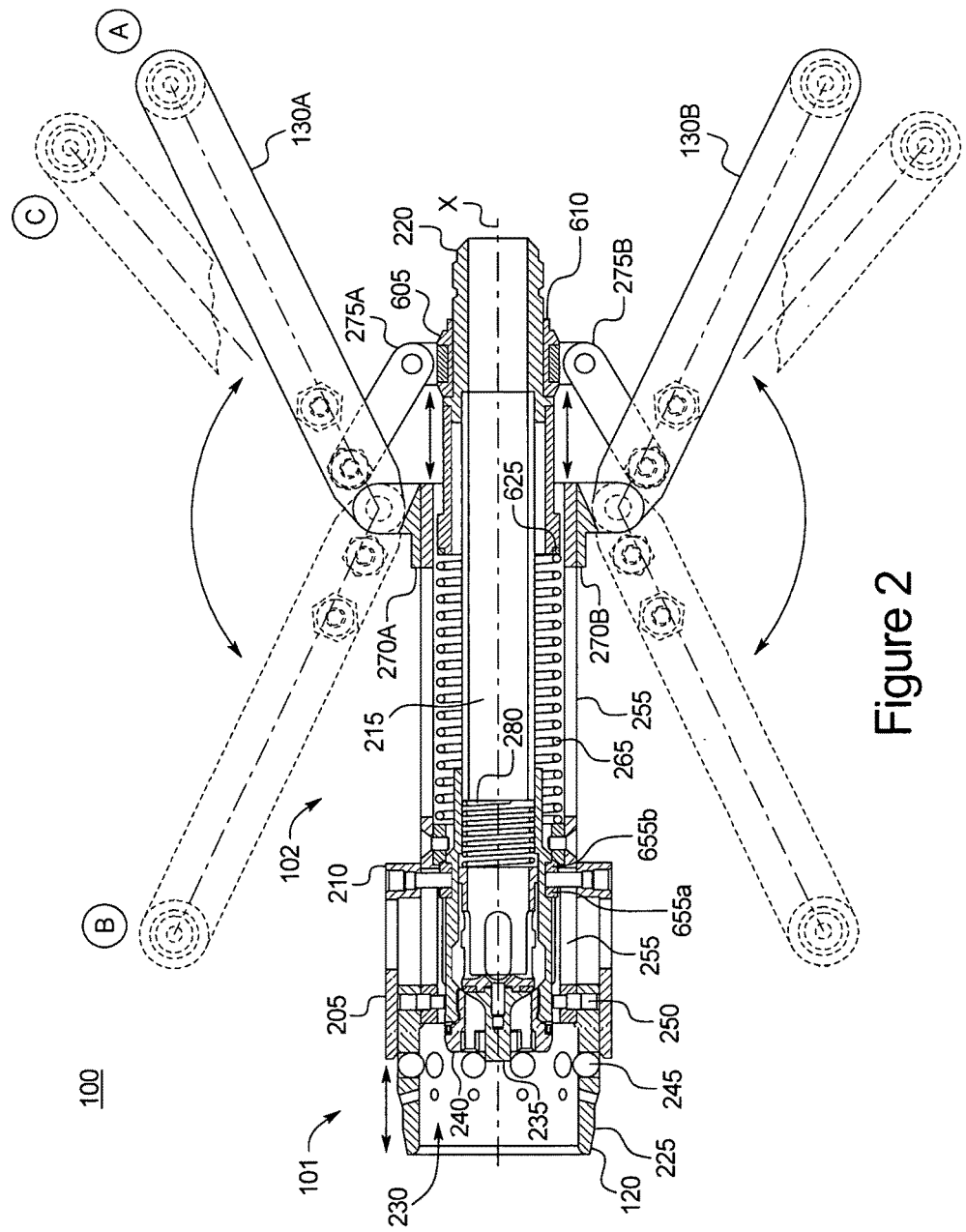
FIG. 2 is a top cross-sectional view of the rapid-connect coupler of FIG. 1.

FIG. 1 is a top view of a rapid-connect coupler 100 having a coupler head section 101 and a coupler body section 102. The components of rapid-connect coupler 100 may be considered to be part of a first structure and/or a second structure, wherein component(s) of the first structure and the second structure are configured to move relative to each other as further described herein. The first structure may include a sleeve 205, one or more drive pins 210, and a probe assembly 215, which includes a coupling end 220. The one or more drive pins 210 extend through a respective drive slot 140 defined in a ball cage 225. The drive pins 210 link the sleeve 205 to the probe assembly 215. In various embodiments, the drive pins 210 are fixed to the probe assembly 215 via opposing retaining rings 655a and 655b. As shown in FIG. 2, the retaining rings 655a and 655b compress against an outer circumference of the probe assembly 215. The second structure includes the ball cage 225 defining a coupling orifice 230 and including one or more balls 245.

A first poppet assembly 235 resides within coupling orifice 230 and may be biased by a poppet assembly spring 280. The first poppet assembly 235 further comprises a retainer 240 and a seal assembly 260. The second structure may further include one or more guide pins 250, and a housing barrel 255. In an embodiment, the one or more guide pins 250 center probe assembly 215 along the longitudinal central axis of housing barrel 255. Additionally, in an embodiment, the second structure, or portions thereof, may be removable and configured for easy and swift removal and replacement, which may be required due to damage or maintenance needs. Certain portions of the design described herein are similar to that disclosed in commonly owned U.S. Pat. No. 9,194,524, the contents of which are incorporated herein by reference in their entirety.

Rapid-connect coupler 100 further includes a first handle 130A and a second handle 130B. FIG. 1 illustrates the positions of the first handle 130A and the second handle 130B in three different configurations of rapid-connect coupler 100: (1) configuration A corresponds to a decoupled state of rapid-connect coupler 100; (2) configuration B corresponds to a coupled state of rapid-connect coupler 100; and (3) configuration C corresponds to a semi-coupled state of rapid-connect coupler 100 that enables venting. As discussed below, a vent stop assembly is configured to provide a hard stop in configuration C.

FIG. 2 is a top cross-sectional view of the rapid-connect coupler 100 in configuration A when handles 130A and 130B are pulled all or substantially all the way back away from coupler head section 101. Handles 130A and 130B are rotatably coupled to housing barrel 255 via a first barrel flange 270A and a second barrel flange 270B. Additionally, a first link assembly 275A and a second link assembly 275B are rotatably attached to first handle 130A and second handle 130B, respectively. The first link assembly 275A and second link assembly 275B are also rotatably attached to probe assembly 215. More specifically, one end of each link assembly 275 may be fixed to a handle 130. The other end of each link assembly 275 may be fixed to the probe assembly 215 via a base 605. In some embodiments, the base 605 is directly attached to the probe assembly 215. In other embodiments, the base 605 is fixed to the probe assembly 215 via a compressive force delivered by a ring 610.

Figure 3:
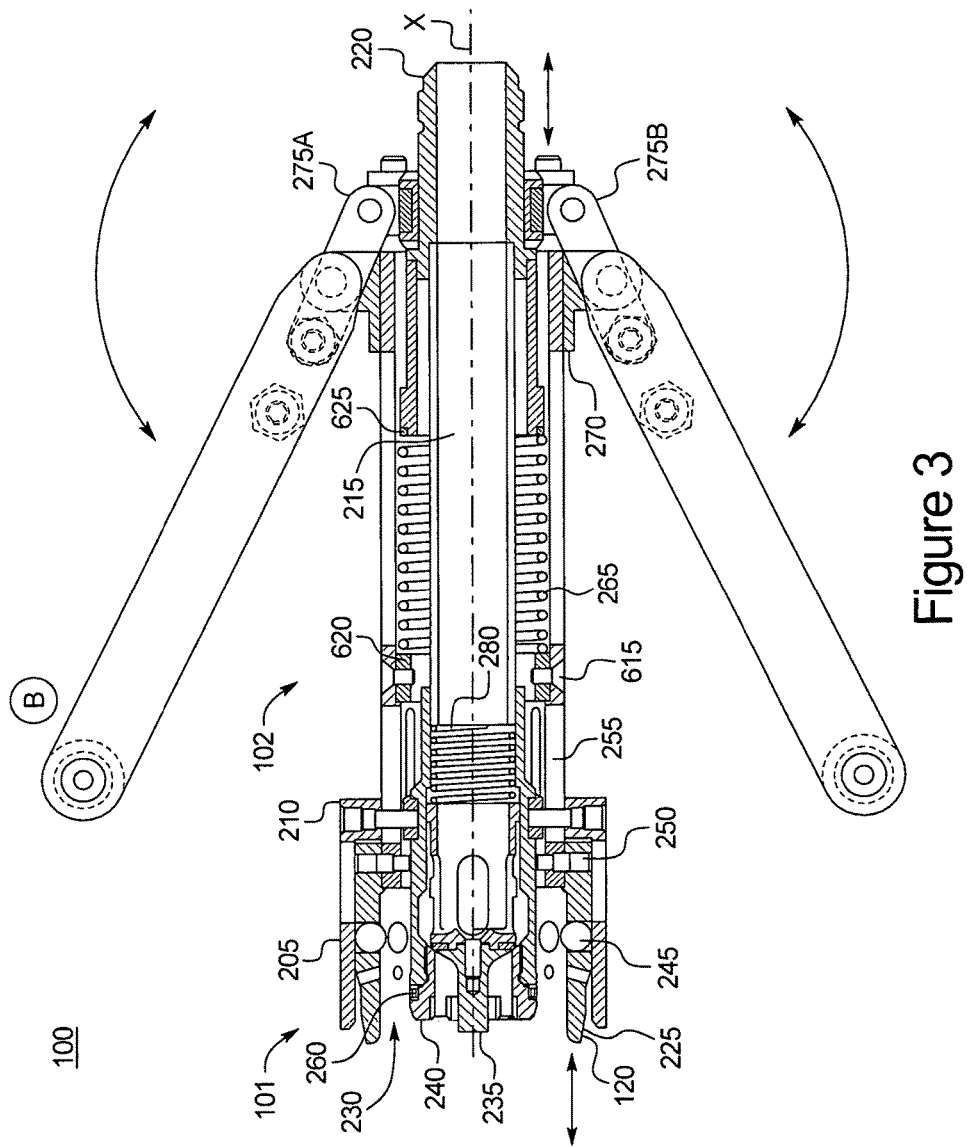
FIG. 3 is a top cross-sectional view of the rapid-connect coupler of FIG. 1 with the handles in a second position.

As handles 130A and 130B rotate, enabling the rapid-connect coupler 100 to transition between the A and B configurations, the first structure longitudinally translates relative to the second structure along the central axis X. More specifically, rotation of handles 130A and 130B from their positions in configuration A to their positions in configuration B delivers longitudinal force to probe assembly 215, via link assemblies 275. This longitudinal force opposes a counter-biasing force of probe spring 265, enabling longitudinal translation of probe assembly 215 in housing barrel 255. Sleeve 205 longitudinally translates with probe assembly 215 by virtue of drive pins 210. In FIG. 2, sleeve 205 is longitudinally retracted with respect to ball cage 225. In FIG. 3, sleeve 205 is longitudinally extended with respect to ball cage 225. One end of probe spring 265 may rest on spring seat 625, which is fixed to flange 290. Flange 290 is described in detail below. The other end of probe spring 265 may rest against spring stop 620, which is fixed to housing barrel 255 via pins, screws, or bolts 615.

Figure 4:
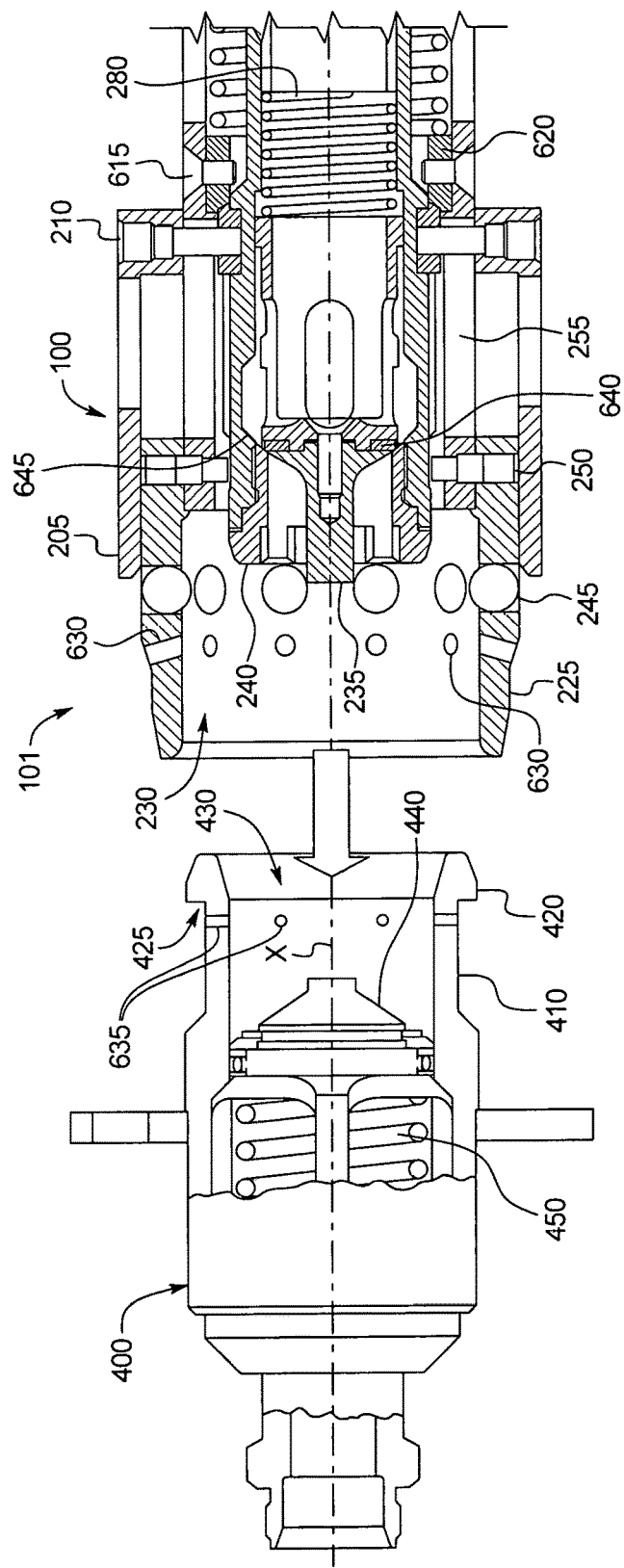
FIG. 4 is a side cross-sectional view of the rapid-connect coupler of FIG. 1 and an exemplary receptacle.

FIG. 4 is a side cross-sectional view of a rapid-connect coupler 100 and a fueling receptacle 400 aligned along a central axis X. The fueling receptacle 400 comprises a coupling body 410, which includes a lip 420, and a recess 425 behind lip 420. The coupling body 410 defines a second poppet orifice 430. A second poppet assembly 440 is disposed within second poppet orifice 430 and is biased closed by spring 450.

Rapid-connect coupler 100 is configured to couple with fueling receptacle 400. Referring to FIG. 4, coupling body 410 slides into first coupling orifice 230, enabling retainer 240 to slide into second poppet orifice 230. As retainer 240 slides into second poppet orifice 230, spring seal 260 seals against an inner diameter of coupling body 410. Additionally, first poppet assembly 235 bears against second poppet assembly 440. Force from second poppet assembly 440 opposes counter-biasing force of spring 280, enabling first poppet assembly 235 to longitudinally translate until reaching a hard stop 650 (labeled in FIG. 9). When first poppet assembly 235 longitudinally translates, sealing surface 640 of poppet assembly 235 retreats from valve seat 645 of retainer 240. Fluid may now flow from coupling end 220, through probe assembly 215, and into second poppet orifice 430.

Once first poppet assembly 235 bears against, hard stop 650 (labeled in FIG. 9), first poppet assembly 235 transfers enhanced longitudinal force to second poppet assembly 440. The enhanced force opposes a counter-biasing force of spring 450 and enables second poppet assembly 440 to longitudinally retreat from a valve seat (not shown). It should be appreciated that second poppet assembly 440 may operate according to the same general principles as first poppet assembly 235.

In configuration A, when coupling body 410 is received within first coupling orifice 230, the lip 420 pushes the one or more balls 245 radially outward in their slots 910 (see FIG. 9) until lip 420 longitudinally translates past the balls 245. A user then engages configuration B, as shown in FIG. 3. In configuration B, sleeve 205 covers the slots 910, which locks balls 245 into a recess 425 behind lip 420. Coupling body 410 is now locked within first coupling orifice 230.

In configuration B, the second poppet assembly 440 and the first poppet assembly 235 may be operable to enable fluid flow from the rapid-connect coupler 100 into coupling body 410. As discussed above, seal 260 seals against the interior circumference of the coupling body 410 within the second poppet orifice 430. In an embodiment the seal assembly 260 is a two piece seal including an energizing spring.

When the rapid-connect coupler 100 is released from fueling receptacle 400, fluid (e.g. liquid natural gas), may vent from rapid-connect coupler 100 as the connection with fueling receptacle 400 is broken. The fluid vents through slots 635 in receptacle 400 and slots 630 in coupler 100. In some embodiments, venting occurs when seal 260 longitudinally retreats past slots 635, thus exposing second poppet orifice 430 to ambient atmosphere.

It is desirable to allow rapid-connect coupler 100 to vent before rapid-connect coupler 100 is fully disengaged from fueling receptacle 400 because venting can generate a substantial propulsive force on one or more of the coupler 100 and the receptacle 400. In an embodiment, the rapid-connect coupler 100 applies a positive stop in configuration C, which enables the rapid-connect coupler 100 to vent before it is fully disengaged from fueling receptacle 400.

Figure 7:
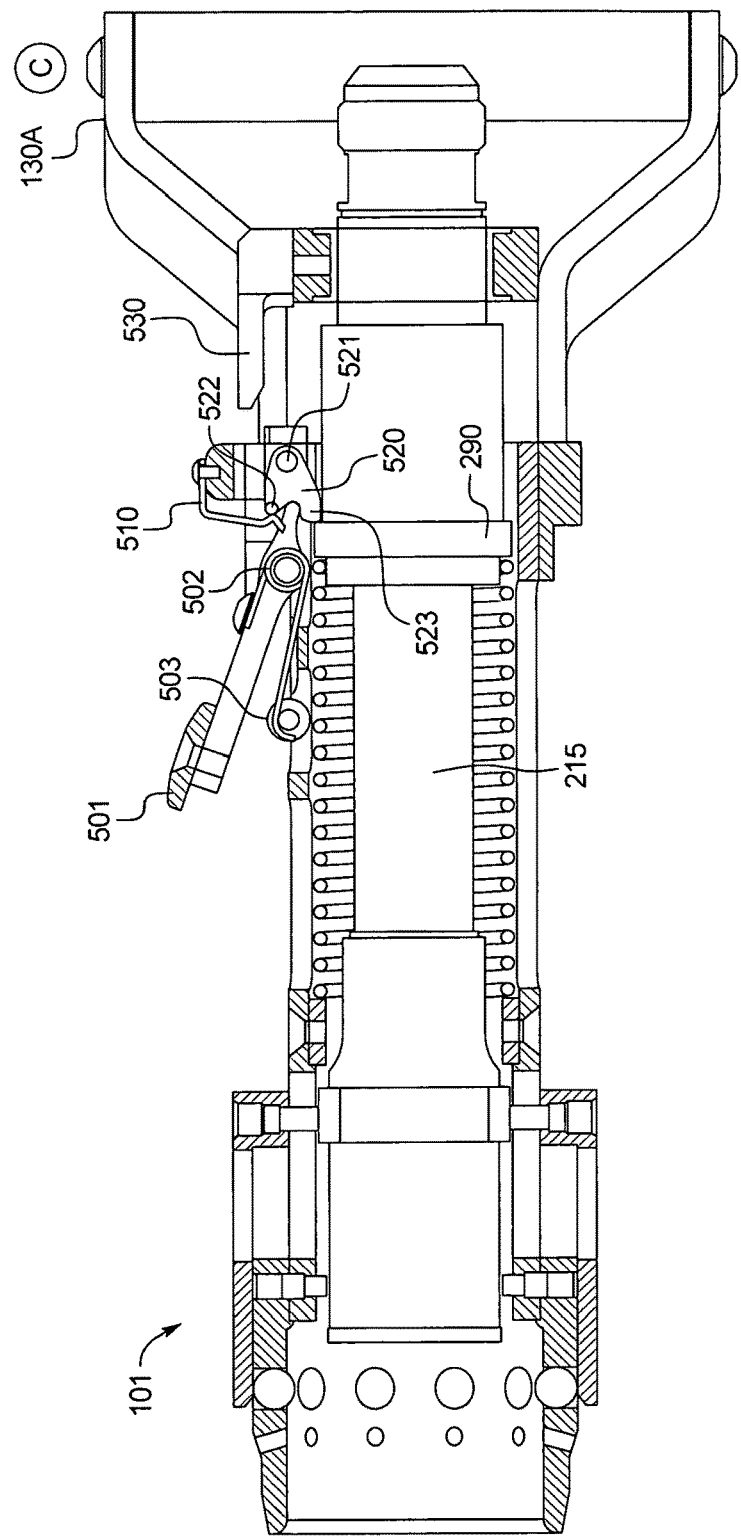
FIG. 7 is a cross-sectional side view similar to FIG. 5 with the handles in a third position and with a stop in a first position.

FIG. 7 shows configuration C of rapid-connect coupler 100. In general terms, probe assembly 215 hard stops against edge 523. In this position, sleeve 205 covers the balls 245 (and more specifically, the ball slots 910). As a result, sleeve 205 presses balls 245 into groove 425. Receptacle 400 cannot detach from coupler 100 in this position. The poppet assemblies no longer touch and therefore close. Further, seal 260 has longitudinally retreated behind venting slots 635, enabling venting of fluid from orifice 430 to ambient via venting slots 635 and 630.

After venting has been completed, a user may actuate the vent stop assembly to fully retract probe assembly 215 (and therefore sleeve 205). Now lip 420 exerts a radial force on balls 245, causing balls 245 to radially translate and disengage from groove 425. Once this has occurred, the user may retract coupler 100 from receptacle 400. In various embodiments, the balls 245 are spherical, made of a metal, and sized for an interference fit within slots 910. The spherical shape of the balls 245 advantageously release from grooves 425 more efficiently than other shapes. Also, spherical balls 245 tend to release ice efficiently.

Figure 5:
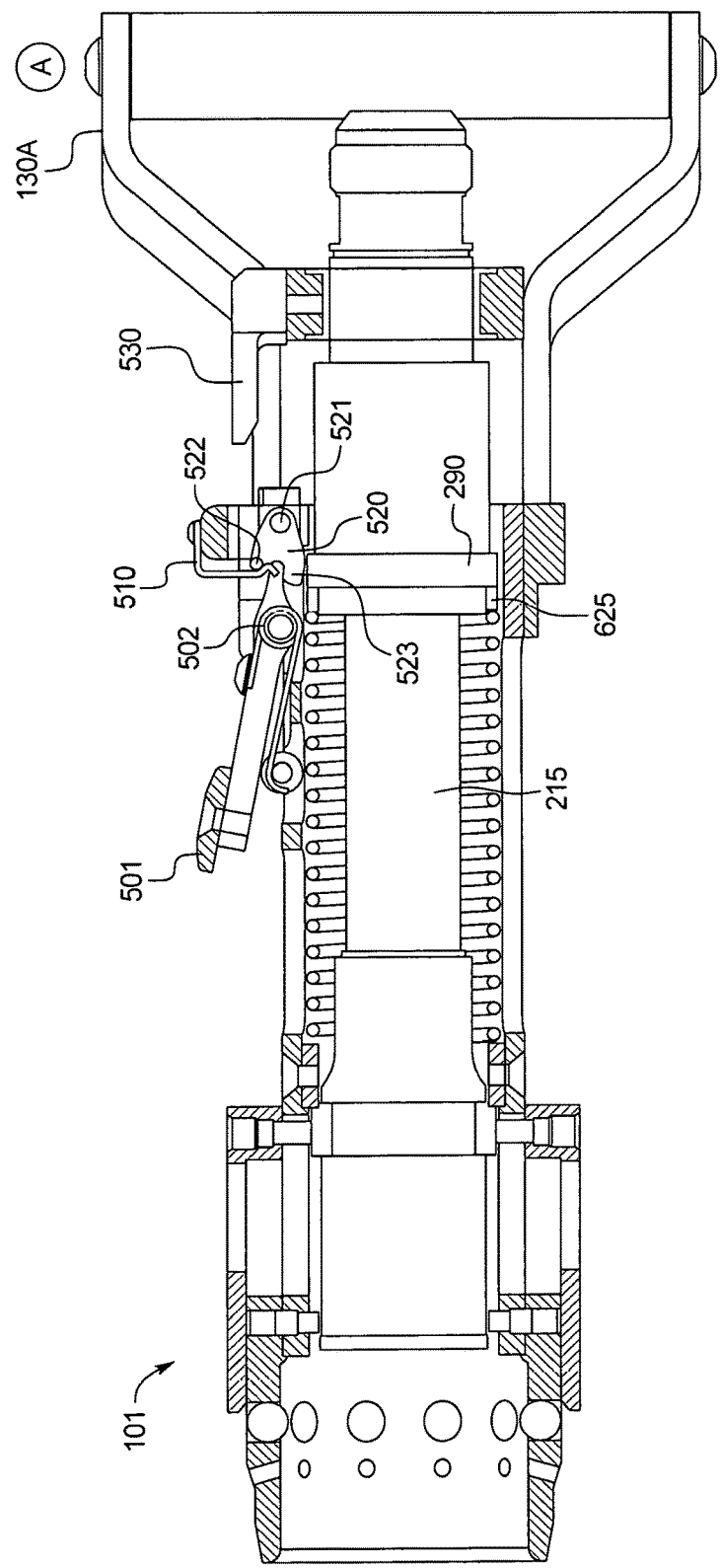
FIG. 5 is a cross-sectional side view of the rapid-connect coupler of FIG. 1 along 5-5 of FIG. 1 with the handles in a first position.

As discussed above, rapid-connect coupler 100 is configured to generate a positive stop at configuration C via a vent stop assembly. FIG. 5 depicts the vent stop assembly and also shows the rapid-connect coupler 100 in the decoupled state corresponding to configuration A. The vent stop assembly includes a release lever 501, a lever spring 502, a lever spring connector 503, a latch pawl 520, a catch 510, a latch pin 522, and reset cam 530. Release lever 501, lever spring connector 503, catch 510, and latch pawl 520, may be attached, either directly or indirectly, to housing barrel 255, while reset cam 530 may be attached to probe assembly 215. In various embodiments, one end of the lever spring 502 directly attaches to release lever 501 and another end of lever spring 502 directly attaches to lever spring connector 503, which is fixed to housing barrel 255.

Latch pawl 520 is rotatably mounted on rod 521 and is rotatable between a "down" position where its front edge 523 engages with probe flange 290 to provide the hard stop that arrests translation of probe assembly 215 at configuration C, as shown in FIG. 7, and an "up" position where latch pawl 520 is clear of probe flange 290, as shown in FIG. 5. As described below, reset cam 530 acts to reset latch pawl 520 from its "up" position to the "down" position when handles 130A, 130B are moved from configuration A to configuration B. In the depicted embodiment, latch pawl 520 is biased down towards probe assembly 215 due to the downward biasing force of release lever 501 and/or lever spring 502.

When rapid-connect coupler 100 is in configuration A, as illustrated in FIG. 5, latch pawl 520 is retained in the "up" position by frictional forces between latch pawl 520 and catch 510. Such frictional forces provide an upward holding force that may be greater than, or equal to, the downward biasing forces being exerted on the latch pawl 520 by one or more of the rod 521 and release lever 501. Latch pawl 520 does not engage with probe flange 290 while latch pawl 520 is being held in this "up" position by catch 510.

As illustrated in FIGS. 1 and 5, latch pin 522 is fixed to latch pawl 520 and may be integrally formed with latch pawl 520. Latch pin 522 transversely extends beyond the outer sides of latch pawl 520. In FIG. 5, for example, latch pin 522 extends into and out of the page. This enables latch pin 522 to engage both sides of catch 510 (FIG. 1 shows the two sides of catch 510) without contacting latch pawl 520 directly. This advantageously reduces wear on latch pawl 520 and clears room for lever 501 to engage latch pawl.

Alternatively, according to some embodiments, latch pawl 520 may be configured to include a top opening (not illustrated) having latch pin 522 extending across it such that latch pawl 520 may be configured to engage latch pin 522 through the top opening without contacting latch pawl 520 directly.

By configuring catch 510 to hold latch pawl 520 in the "up" position, the front edge 523 of latch pawl 520 does not contact probe flange 290 as probe assembly 215 translates forward towards coupler head section 101 as rapid-connect coupler 100 transitions from configuration A (i.e., the decoupled state) to configuration B (i.e., coupled state). The angled shape of latch pawl 520 also aids in preventing a hard stop of probe assembly 215 during such movement.

Figure 6:
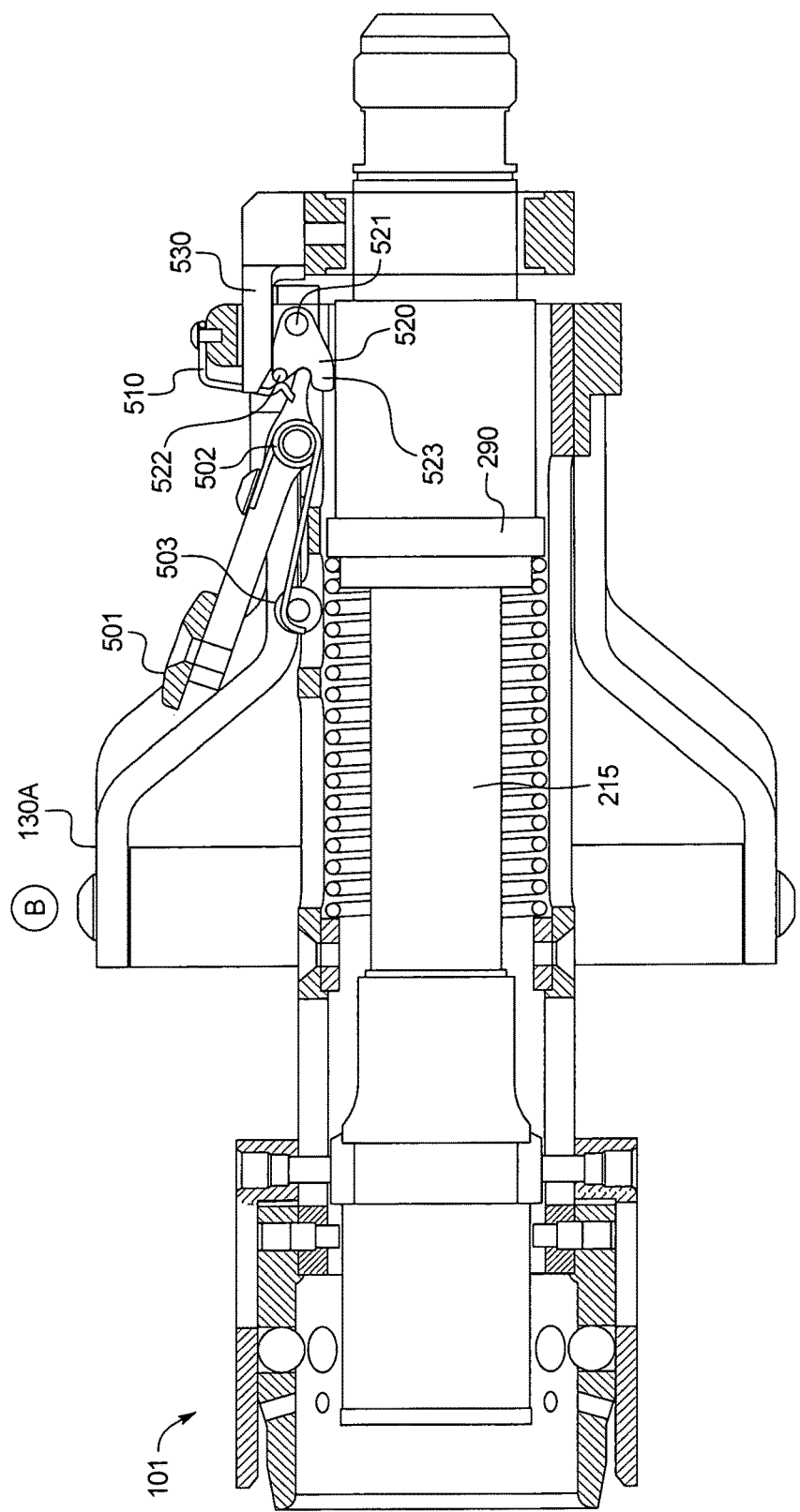
FIG. 6 is a cross-sectional side view similar to FIG. 5 with the handles in the second position.

Reset cam 530 translates with probe assembly 215 and begins engagement with latch pawl 520 as rapid-connect coupler 100 transitions to configuration B, as shown in FIG. 6. In configuration B, rapid-connect coupler 100 is coupled to, for example, fueling receptacle 400 as illustrated in FIG. 4. As discussed above, coupler 100 is configured to flow fluid to receptacle 400 in configuration B.

As rapid-connect coupler 100 transitions from configuration A to configuration B, handles 130A and 130B rotate toward coupler head section 101. The forward rotation of handles 130A and 130B rotates links 275, thus longitudinally translating probe assembly 215 from within housing barrel 255 into a coupled engagement with fueling receptacle 400. The translation of probe assembly 215 causes reset cam 530 to translate forward to engage latch pawl 520. By engaging latch pawl 520, reset cam 530 releases latch pawl 520 from its up position and rotates latch pawl 520 to its "down" position (shown in FIG. 6). After being reset by reset cam 530, latch pawl 520 is biased to its down position by one or more of the release lever 501 and/or lever spring 502.

When handles 130A and 130B rotate away from coupler head section 101, rapid-connect coupler 100 transitions from configuration B to configuration C, which is shown in FIG. 7. The transition of handles 130A and 130B further causes the translation of probe assembly 215 back into second housing barrel 255 until probe flange 290 contacts latch pawl 520. Following the release of the latch pawl 520 from the "up" position to the "down" position in configuration B, latch pawl 520 is now in place to contact probe flange 290, as shown in FIG. 7. As described above, latch pawl 520 provides a hard stop that prevents probe assembly 215 from further retreating within housing barrel 255. As described above, this keeps coupler 100 and receptacle 400 locked together by virtue of balls 245 and sleeve 205.

Figure 8:
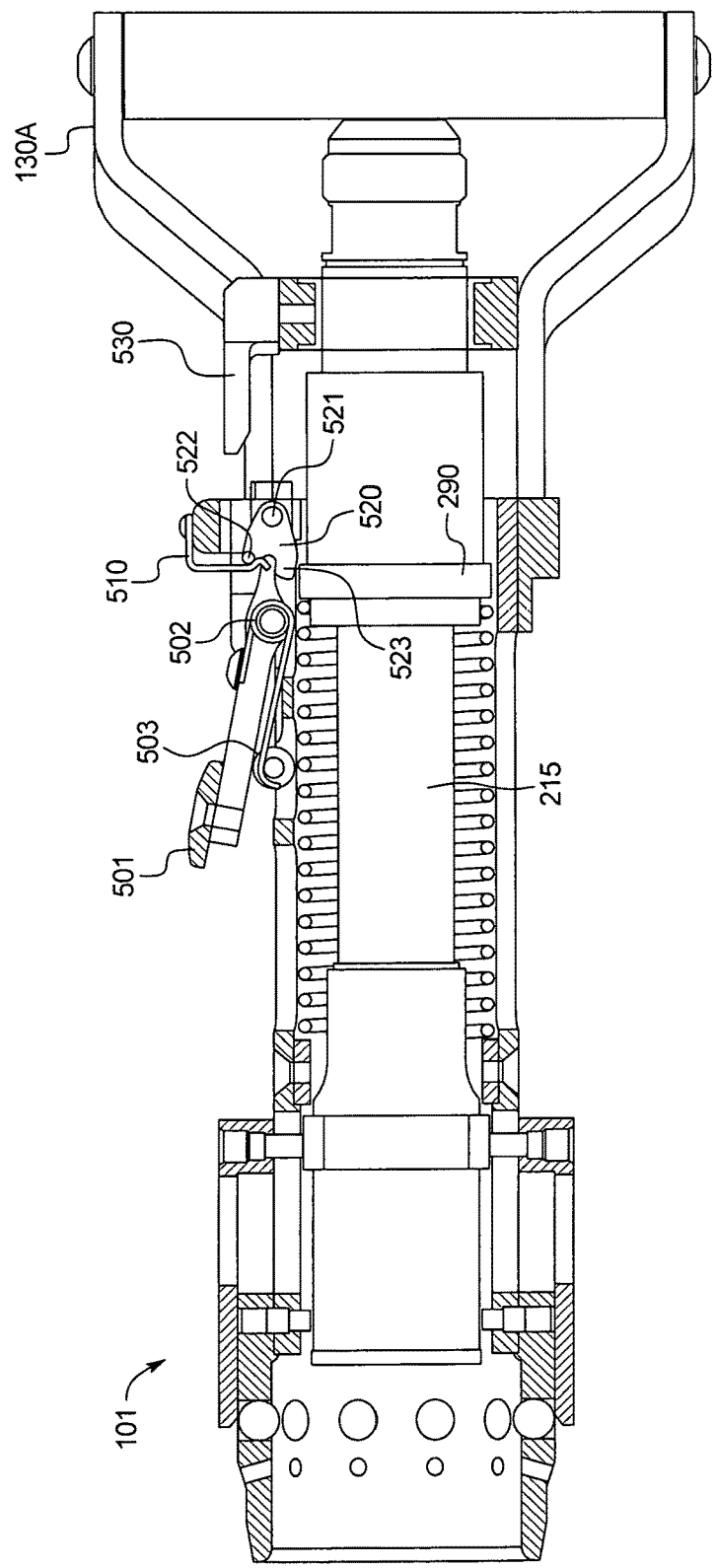
FIG. 8 is a cross-sectional side view similar to FIG. 7 with the stop in a second position.

Latch pawl 520 may be released from its hard stop engagement with probe flange 290 via release lever 501. The user may release latch pawl 520 after proper venting has been accomplished. FIG. 8 illustrates rapid-connect coupler 100 following the release of the hard stop provided by latch pawl 520 engaging with probe flange 290. Handles 130A and 130B may continue to occupy their configuration C positions. A downward force on the opposing end of release lever 501 releases latch pawl 520 from the hard stop. More specifically, the downward force on the opposing end of release lever 501 causes the other end of release lever 501 to lift or rotate latch pawl 520 toward the catch 510. As described above, the spring 502 may bias release lever 501 to the position shown in FIG. 7. In various embodiments, the release lever 501 pivots about the attachment point between the spring 502 and the release lever 501.

If a part in the coupler 100 becomes stuck due to freezing, it may be necessary to longitudinally agitate (i.e., push and pull) rapid-connect coupler 100 to fully de-couple from fueling receptacle 400. More specifically, a user may need to apply force to handles 130 until the ice breaks and the probe assembly 215 is free to move. In these cases, it may be advantageous or necessary to eliminate the hard stop provided by pawl 520. Catch 510 is configured to provide sufficient upward holding force (e.g., frictional force) on latch pawl 520 in order to keep latch pawl 520 in the "up" position while the rapid-connect coupler is being agitated. By using catch 510 to help maintain the latch pawl 520 in the "up" position, the risk of latch pawl 520 falling down and re-engaging with probe flange 290 to provide the hard stop as rapid-connect coupler 100 is being agitated back and forth may be reduced, or even eliminated.

Typically a user will understand the rapid-connect coupler 100 needs to be longitudinally agitated following the completion of a venting process when coupler 100 is in configuration C of FIG. 7. The user may now apply release lever 501 to release the latch pawl 520 from the hard stop position into the "up" position shown in FIG. 8. More specifically, after realizing a need for the rapid-connect coupler 100 to be longitudinally agitated, the user may longitudinally agitate the rapid-connect coupler 100 while catch 510 holds latch pawl 520 in the "up" position. During longitudinally agitation of rapid-connect coupler 100, catch 510 is configured to keep latch pawl 520 in the "up" position.

Figure 9:
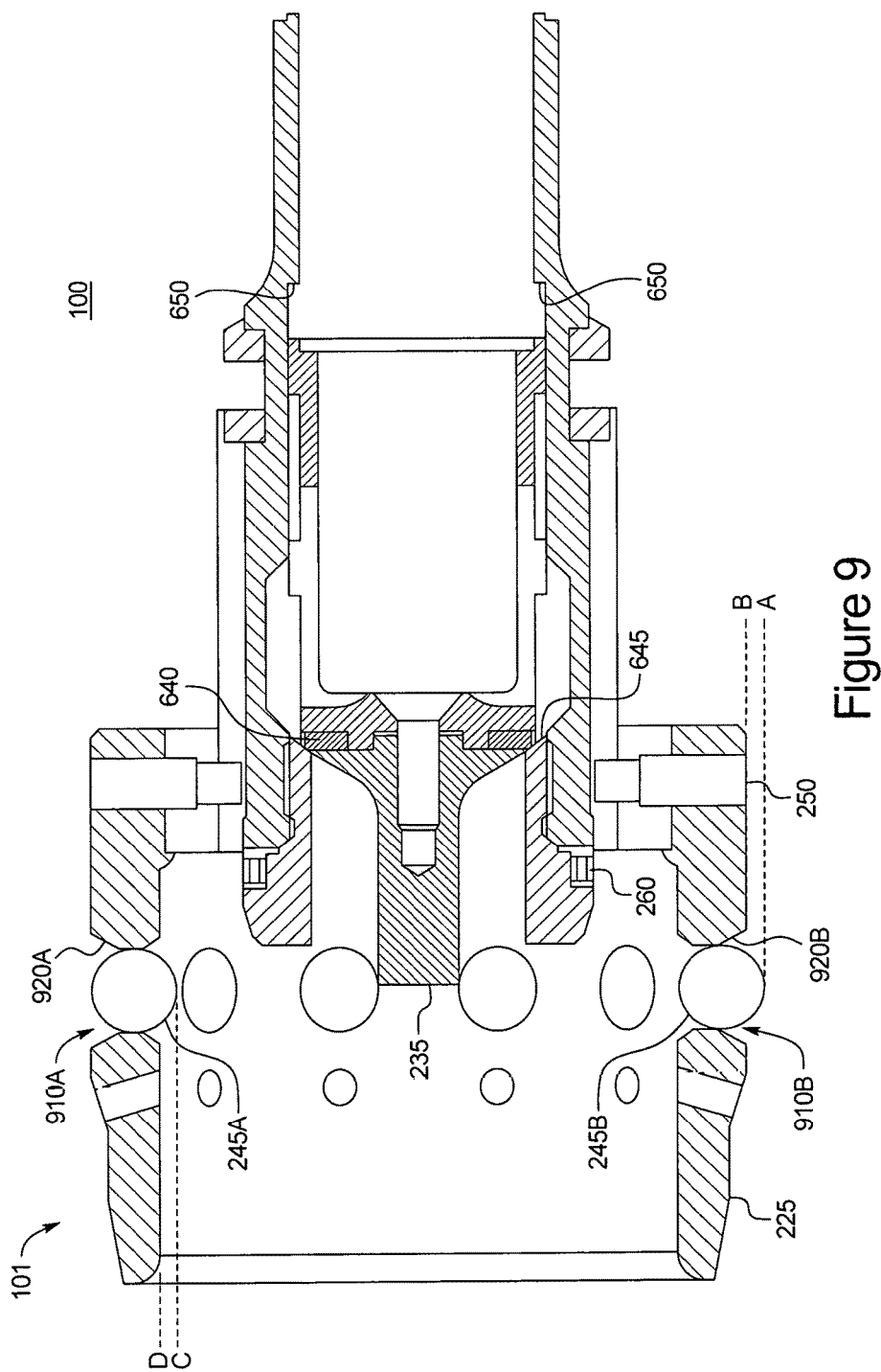
FIG. 9 is a cross-sectional view of a coupling head of the rapid-connect coupler of FIG. 1 showing details of retaining balls.

Additionally, in some embodiments as depicted in FIG. 9, it may be desirable for the balls 245 to be disposed within tapered slot 910A and tapered slot 910B, which are defined by tapered wall 920A and tapered wall 920B, respectively. For example, tapered slots 910A, 910B may be concave toward the external and internal portions of the ball cage 225. Tapered slots 910A, 910B may be desirable because the tapered slots 910A, 910B tend to release ice more efficiently, which may form within the tapered slots 910A, 910B when cold temperatures are present (e.g., when using a cooled gas such as liquid natural gas or in cold environmental conditions). The tapered walls 920A, 920B may be of various configurations and types of tapers, including linear tapers or curved tapers, and the entirety of the tapered slots 910A, 910B may or may not include a taper. In various embodiments, the balls 245 are made from a metal and sized for a dimensional interference fit inside the tapered slots 910.

The balls 245 are further sized to protrude from the slots 910 in the radial direction. More specifically, the sleeve 105 causes the balls 245 to radially protrude from an inner circumference of ball cage 225. When sleeve 105 does not cover slots 910, lip 420 causes the balls to radially protrude from an outer circumference of ball cage 225. In FIG. 9, ball 245B outwardly radially protrudes from outer circumference B of ball cage 225 to distance A. The outer most point of ball 245B now radially extends a distance A-B from ball cage 225. In FIG. 9, ball 245A inwardly radially protrudes from inner circumference D of ball cage 225 to a distance C. The inner most point of ball 245A now radially extends a distance C-D from ball cage 225. In some embodiments, gravity may cause balls 245 to occupy the positions shown in FIG. 9. In other embodiments, the dimensional interference fit is too tight for gravity to radially translate the balls 245.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A fluid coupler comprising:
   a housing;
   a probe slidably disposed in the housing between a coupled position and an uncoupled position; and
   a stop assembly connected to the housing and configured to:
      in an active position, catch the probe at a venting position as the probe moves from the coupled position to the uncoupled position;
      selectively move from the active position to an inactive position to release the probe to move from the venting position to the uncoupled position; and
      permit the probe to move freely from the uncoupled position to the coupled position; and
   a reset cam connected to the probe and configured to move the stop assembly from the inactive position to the active position as the probe moves from the uncoupled position to the coupled position.

2. The fluid coupler of claim 1, wherein the stop assembly has a pawl rotatably connected to the housing and catches the probe via the pawl.

3. The fluid coupler of claim 2, wherein the housing defines a slot and the pawl engages the probe via the slot.

4. The fluid coupler of claim 2, wherein the reset cam engages the pawl when the probe is in the coupled position.

5. The fluid coupler of claim 2, wherein the probe includes a flange, and the pawl engages the flange to catch the probe.

6. The fluid coupler of claim 5, wherein the pawl comprises a front edge and a rounded rear face, and the pawl engages the flange via the front edge in the venting position, and the flange slides past the pawl via the rounded rear face as the probe moves from the uncoupled position to the coupled position.

7. The fluid coupler of claim 2, wherein the stop assembly comprises a resilient catch to urge the pawl away from the probe when the stop assembly is in the inactive position.

8. The fluid coupler of claim 7, wherein the pawl includes a latch pin; and the catch engages with the pawl via the latch pin.

9. The fluid coupler of claim 2, wherein the stop assembly includes a lever engaged with the pawl to selectively rotate the pawl away from the probe to release the probe.

10. The fluid coupler of claim 9, wherein the lever is rotatably connected to the housing.

11. The fluid coupler of claim 10, further comprising a lever spring to urge the lever and the pawl toward the active position.

12. The fluid coupler of claim 11, wherein the housing comprises a lever shaft, the lever rotates about the lever shaft, and the lever spring is disposed about the lever shaft.

13. The fluid coupler of claim 1, further comprising a spring disposed in the housing and about the probe urging the probe toward the uncoupled position.

14. The fluid coupler of claim 13, wherein the probe includes a flange and the spring engages the probe via the flange.

15. A fluid coupler comprising:
   a housing;
   a probe slidably disposed in the housing and comprising a flange;
   a pawl rotatably connected to the housing and configured to catch the flange as the probe moves in a first direction and permit the probe to slide freely in a second direction;
   a lever engaged with the pawl to selectively rotate the pawl away from the flange to release the probe; and
   a reset cam to rotate the pawl toward the probe as the probe moves in the second direction.

16. The fluid coupler of claim 15, further comprising a resilient catch to retain the pawl when the lever rotates the flange away from the probe.

17. The fluid coupler of claim 16, wherein the reset cam overcomes the resilient catch to rotate the pawl toward the probe.

18. The fluid coupler of claim 15, further comprising a lever spring engaged with the lever and the housing to urge the lever and the pawl toward the probe.

19. The fluid coupler of claim 15, wherein:
   the pawl comprises a front edge and a rounded rear face;
   the pawl catches the flange via the front edge as the probe moves in the first direction; and
   the flange slides past the pawl via the rounded rear face as the probe moves in the second direction.

20. A fluid coupler comprising:
   a sleeve;
   a ball cage slidably disposed in the sleeve;
   a housing connected to the ball cage;
   a probe having a flange, slidably disposed in the housing, and connected to the sleeve such that:
      when the probe moves in a first direction, the ball cage extends from the sleeve; and
      when the probe moves in a second direction, the ball cage retracts into the sleeve;
   a pawl rotatably connected to the housing and configured to catch the flange as the probe moves in the first direction, selectively release the flange, and permit the probe to slide freely in the second direction; and
   a reset cam to rotate the pawl toward the probe as the probe moves in the second direction.

* * * * *